Feb. 3, 1953  R. R. STEVENS  2,627,168
CONTROL APPARATUS FOR PLURAL CLUTCH OPERATION
Filed May 5, 1949
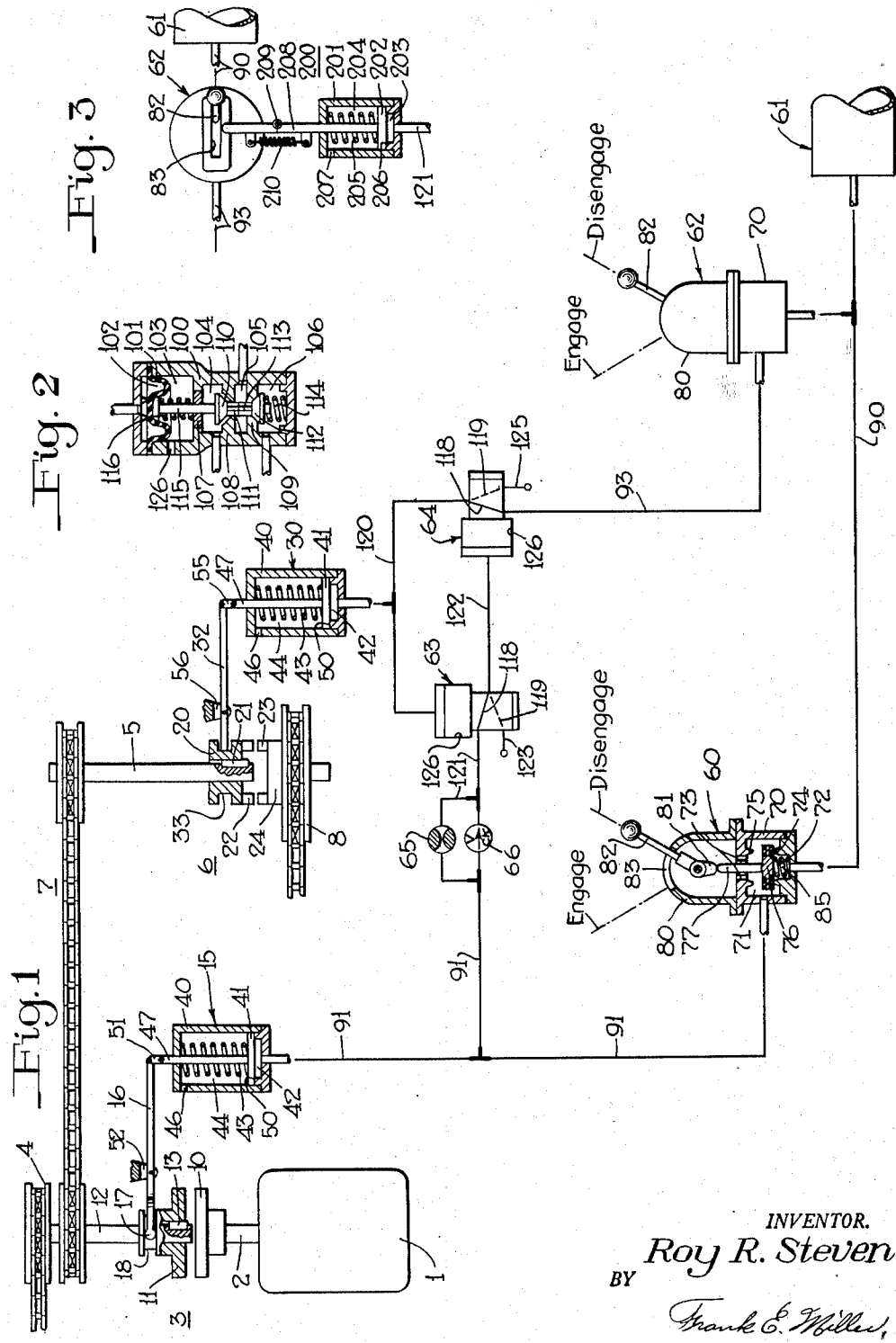
INVENTOR.
Roy R. Stevens
BY
Frank E. Miller,
ATTORNEY

UNITED STATES PATENT OFFICE 2,627,168

CONTROL APPARATUS FOR PLURAL CLUTCH OPERATION

Roy R. Stevens, Forest Hills, Pa., assignor to Westinghouse Air Brake Company, a corporation of Pennsylvania Application May 5, 1949, Serial No. 91,605

7 Claims. (Cl. 60—97)

This invention relates to control apparatus and more particularly to fluid pressure control apparatus for controlling series operation of two clutches.

According to the principal object of the invention I provide means for controlling operation of a fluid pressure actuated input friction clutch and a fluid pressure actuated positive output clutch for serial connection between a prime mover and an output shaft in such a fashion that the jaw clutch may not be engaged while the friction clutch is engaged.

According to the above object, I provide a respective fluid pressure control valve device for controlling the engagement and disengagement of each of the two clutches arranged in series. In cooperation with the control valve devices I provide interlock means in the form of an arrangement of relay valve devices for rendering the output clutch control valve device ineffective to effect engagement of the positive output clutch when the input clutch is engaged.

Other objects and advantages of the invention will become obvious from the following more detailed description thereof.

In the accompanying drawing; Fig. 1 is a schematic representation, partly in outline and partly in section, of a clutch control system embodying the invention; Fig. 2 is a cross-sectional detailed schematic view of a relay valve device, several of which are employed in the control system shown in Fig. 1; and Fig. 3 is a plan view of a portion of an alternate interlock arrangement which might be employed in the clutch control system shown in Fig. 1.

Description

Referring to the drawing, the power unit for which the control system embodying the invention is provided may comprise a prime mover 1 arranged to drive an input shaft 2 through the medium of a friction clutch 3, the output of which clutch 3 is adapted to drive any desired device (not shown) through such as a sprocket and chain arrangement 4 and to drive an input shaft 5 to a positive type clutch 6 through a chain and sprocket wheel arrangement 7 to allow for driving another device (not shown) through such as a chain and sprocket arrangement 8 adapted to be driven through said positive clutch.

The friction clutch 3 may comprise a driving friction element 10 secured for rotation with the shaft 2 and a driven friction element 11 to which the chain and sprocket arrangements 4 and 7 are secured for rotation therewith through the medium of a shaft 12 and a key 13 fit in a groove in said shaft in the well-known manner. The driven friction element 11 is slidable on the shaft 12 into and out of contact with the driving element 10 to engage and disengage, respectively, the clutch 3. For effecting such engagement and disengagement of the clutch 3, a fluid pressure motor 15 is provided which is operatively connected to the driven friction element 11 through such as a lever 16 attached to a dog 17 which rides in a groove 18 in a hub portion of the element 11.

The positive type clutch 6, for which the invention is provided to protect, may be of the jaw type, comprising, schematically for example, a driving element 20 secured for rotation with the shaft 5 by means of such as a key 21 and slidable on said shaft to cause engagement and disengagement of attached teeth 22 with mating teeth 23 formed in a driven element 24 to which the sprocket and chain arrangement 8 is operably connected. To effect such engagement and disengagement of the clutch 6, a fluid pressure motor 30 is provided, which may be similar to the motor 15 for operating the clutch 3. The motor 30 may be operatively connected to the driving element 20 through the medium of a lever and dog arrangement 32 for which an annular groove 33 may be provided in a hub portion of said driving element.

The motors 15 and 30, for sake of illustration, may be substantially alike, and may comprise, schematically, a hollow cylindrical casing 40 having a piston 41 slidably disposed therein subject opposingly to pressure of fluid in a pressure chamber 42 at one side and to the force of a compression spring 43 disposed in a chamber 44 on its opposite side; chamber 44 being constantly open to atmosphere by way of a port 46 in the casing. A piston rod 47 is secured for movement with the piston 41 and said rod extends through chamber 44 and outwardly through an opening in the end wall of the casing to the exterior thereof. In response to pressure of fluid supplied to the chamber 42, the piston 41 will be caused to move in the direction of the chamber 44 against action of the spring 43. Upon subsequent venting of fluid under pressure from the chamber 42, the spring 43 will return the piston to the position in which it is shown in the drawing seated on an annular shoulder 50 formed in a casing member.

The rod 47 of motor 15 is connected to the lever 16 through a link 51, and the lever is so arranged relative to travel of said rod as to cause engagement of the clutch 3 by movement of the respective piston 41 when fluid under pressure is supplied to the respective chamber 42; a fixed fulcrum element 52 being shown in the drawing to which lever 16 may be pin connected for this purpose. Release of fluid under pressure from chamber 42 in motor 15 will allow disengagement of clutch 3 by action of the respective spring 43.

Similarly, the rod 47 of motor 30 is connected to the lever 32 through a link 55 so that movement of the respective piston 41 in response to supply of fluid under pressure to the respective chamber 42 will cause, through resultant pivotal movement of lever 32 about a fulcrum 56, engagement of the clutch 6. Subsequent release of fluid under pressure from the respective chamber 42 will allow the respective spring 43 to effect release of the clutch 6 through rocking movement of lever 32 in its opposite direction.

According to the invention, for controlling operation of the transmission system, a control valve device 60 is provided which is operable manually to one position to effect supply of fluid under pressure from a fluid pressure reservoir 61 to the chamber 42 in the motor 15 and to another position to effect venting of said chamber 42 to atmosphere.

For controlling operation of the clutch 6, a control valve device 62 is provided which is operable to one position for effecting supply of fluid under pressure from reservoir 61 to the chamber 42 in the motor 30 and to another position for effecting venting of said chamber 42 to atmosphere.

According to a feature of the invention, I provide an interlock arrangement, comprising two relay valve devices 63, 64, which arrangement is sensitive to pressure of fluid in the chamber 42 in motor 15 to control communication between the valve device 62 and the chamber 42 in the motor 30. A choke 65 and a check valve 66 are arranged to modify operation of the interlock arrangement as will be seen from subsequent description.

Each of the valve devices 60 and 62, for sake of illustration, may comprise a casing 70 having formed therein a delivery chamber 71 opening to an inlet opening 72 and exhaust openings 73 at opposite ends of said chamber. An annular valve seat 74 encircles opening 72 and a similar seat 75 encircles openings 73. A double faced valve 76 is disposed in chamber 71 for seating engagement with the seat 74 or the seat 75 for closing of said chamber either from the exhaust openings 73 or the inlet opening 72. A stem 77, reciprocably mounted in the casing, is attached to the valve 76 to act as a medium through which same may be actuated to seat on valve seat 74. A cover member 80 is mounted on the casing member 70 over a projecting end of the stem 77. A cam element 81 is secured for turning movement within the cover member 80 to actuate the stem 77. An operator's lever 82, attached to cam element 81, extends outwardly through a slot 83 in the cover member 80 for effecting turning movement of the cam element 81. A compression spring 85 urges the valve 76 toward the seat 75 and in turn urges the stem 77 into contact with the cam element 81. Through engagement of cam element 81 with stem 77, when the operator's lever 82 is moved to the position in which it is shown in the drawing, indicated in the drawing by a dot-and-dash line titled "Disengage," the valve 76 will be caused to assume the position in which it also is shown in the drawing seated on valve seat 74, with chamber 71 consequently closed to inlet opening 72 and open to exhaust openings 73. When the operator's lever 82 is moved from its "Disengage" position to an opposite "Engage" position, resultant turning movement of the cam element 81 will allow the spring 85 to effect movement of the valve 76 away from seat 74 and into engagement with the seat 75, consequently opening the chamber 71 to the inlet opening 72 and closing said chamber to the exhaust openings 73.

In the control valve device 60, its inlet opening 72 is connected to the reservoir 61 by way of a pipe 90, its delivery chamber 71 is connected to the chamber 42 in the motor 15 by way of a pipe 91 and its exhaust openings 73 are open to atmosphere by way of the interior of the cover member 80 and slot 83 therein.

In the control valve device 62, its inlet opening 72 also is connected to reservoir 61 by way of the pipe 90, its delivery chamber 71 is connected to a pipe 93, and its exhaust openings also are open to atmosphere via its cover chamber and a slot therein.

Referring to Fig. 2, the alike relay valve devices 63 and 64 shown in outline in Fig. 1 each may comprise a casing 100 having a diaphragm 101 disposed therein and subject to pressure of fluid in a diaphragm control chamber 102 at its one side and to pressure of fluid in a chamber 103 at its opposite side. Also formed in the casing are chambers 104, 105 and 106, chamber 104 being separated from the chamber 103 by a partition 107 and from the chamber 105 by a partition 108. A partition 109 separates the chamber 105 from the chamber 106. A valve 110 is disposed in the chamber 104 for controlling communication between the chamber 105 and said chamber 104. The valve 110 may be secured to a fluted stem 111 slidably mounted in a suitable bore extending through the partition 108, a valve seat being formed at the end of the bore opening into the chamber 104 to accommodate the valve 110. A valve 112, similar to the valve 110, is disposed in the chamber 106 for controlling communication between the chamber 105 and said chamber 106. The valve 112 is attached to a fluted stem 113 which is slidably disposed in a suitable bore extending through the partition 109, a valve seat being formed in the end of said bore opening into the chamber 106 to accommodate the valve 112. Both of the fluted stems 111 and 113 project into and meet in the chamber 105. A bias spring 114 is disposed in the chamber 106 arranged to urge the valve 112 towards its seat and at the same time, through engagement of stems 111 and 113, to urge the valve 110 away from its seat. The valve 110 is operably connected to the diaphragm 101 by means of a rod or stem 115 extending through a bore in the partition 107. A control spring 116 is provided in chamber 103 to oppose deflection of the diaphragm 101 in the direction of the chamber 103.

In operation of the relay valve device shown in Fig. 2, with the chamber 103 open to atmosphere, upon supply of fluid under pressure to the control chamber 102, the diaphragm 101 will deflect in the direction of the chamber 103 against opposition of the control spring 116 and the bias spring 114 and will cause seating of the valve 110 and unseating of the valve 112. With the valve 110 closed and the valve 112 open, the chamber 105 will be closed to the chamber 104 and open to the chamber 106. Upon subsequent venting of fluid under pressure from the control chamber 102, the bias spring 114 and the control spring 116 will return the diaphragm 101 and valves 110 and 112 to the positions in which they are shown in the drawing, the valve 112 being seated and the valve 110 unseated. With valve 110 unseated and the valve 112 seated, the chamber 105 will be closed to the chamber 106 and open to the chamber 104.

Hereinafter, in describing operation of either of the relay valve devices 63 and 64 included in the apparatus shown in Fig. 1, with the control chamber vented to atmosphere when the valve 110 is unseated and the valve 112 is seated, connection between the chamber 105 and the chamber 104 by way of the unseated valve 110 will be referred to as a communication 118 represented symbolically in Fig. 1 by a solid line appearing within the outline of the valve devices. Similarly when the valve 110 is seated and the valve 112 is unseated in response to supply of fluid under pressure to the respective control chamber 102 of either of the relay valve devices 63 or 64, the resultant connection between the chamber 105 and the chamber 106 by way of the unseated valve 112 will be referred to as a communication 119, indicated symbolically in the drawing by a dash line appearing within the general outline of the devices.

In the relay valve device 63, its control chamber 102 is connected to a pipe 120 which has a connection with the chamber 42 in the clutch motor 30, its chamber 104 is connected to the pipe 91 by way of a pipe or pipes 121, the choke 65 and check valve 66, its chamber 105 is connected to the control chamber 102 in the relay valve device 64 by way of a pipe 122, and its chamber 106 is connected to atmosphere by way of such as a pipe 123.

In the relay valve device 64, its chamber 104 is connected to the pipe 93, its chamber 105 is connected to a branch of the pipe 120, and its chamber 106 is connected to atmosphere by way of such as a pipe 125.

In both the relay valve device 63 and in the relay valve device 64, the chamber 103 is constantly open to atmosphere by way of such as a port 126.

*Operation of apparatus, Fig. 1*

Assume that the prime mover 1 is operating and turning the shaft 2 and thereby driving friction element 10 of the clutch 3. Assume also that the operator's levers 82 of both of the clutch control valve devices 60 and 62 are in their respective "Disengage" positions in which they are are shown in the drawing. The respective valves 76 in the control valve devices 60 and 62 are therefore seated on the respective valve seats 74 so that both the pipe 91 and the pipe 93 consequently will be vented to atmosphere via the respective openings 73 in said devices, as will be appreciated from previous description. With the pipe 91 thus vented to atmosphere, the chamber 42 in the clutch motor 15 will be so vented as also will be the control chamber 102 in the relay valve device 64 by way of the communication 118 in relay valve device 63, pipe 121 and the choke 65.

With the chamber 42 in clutch motor 15 vented, the friction clutch 3 will be in its disengaged position, as it is shown in the drawing, with shafts 12 and 5 therefore static.

With its control chamber 102 vented to atmosphere, the relay valve device 64 will be positioned establishing its communication 118 connecting the pipe 120 to the vented pipe 93.

The control chamber 102 in the relay valve device 63 will be vented at this time by way of the pipe 120 as also will be the chamber 42 in the clutch motor 30.

With its control chamber thus vented to atmosphere, the relay valve device 63 will be positioned establishing its communication 118 connecting the pipe 121 to the pipe 122 as was assumed.

With the chamber 42 in clutch motor 30 vented to atmosphere, it will be appreciated from previous description that the jaw clutch 6 therefore will be in its disengaged position in which it is shown in the drawing. With the clutch 6 thus disengaged, there will be no driving connection between the output chain and sprocket arrangement 8 and the now static shaft 5.

Now assume that it is desired to effect operation of the device (not shown) driven through the chain and sprocket wheel arrangement 4. The operator may then move the operator's lever 82 of the clutch control device 60 from its "Disengage" position to its opposite "Engage" position, thereby effecting supply of fluid under pressure to the pipe 91, whence it will flow to the chamber 42 in the clutch motor 15 to cause engagement of the friction clutch 3 and via check valve 66, pipe 121 and communication 118 in valve device 63 to the control chamber in the relay valve device 64 to cause disestablishment of its communication 118 and establishment of its communication 119 to assure that the pipe 120 cannot be charged at this time, but will remain vented to atmosphere via the pipe 125.

With the friction clutch engaged, the driving connection thereby established between the prime mover 1 and the shaft 12 will cause operation of the device driven by the chain and sprocket arrangement 4 as was assumed to be desired.

With the pipe 120 vented to atmosphere and disconnected from the pipe 93 at this time the clutch 6 will remain disengaged even though the operator may inadvertently cause fluid under pressure to be supplied to the pipe 93 by moving the operator's lever 82 of the control device 62 from its "Disengage" position to its "Engage" position. It will be seen therefore that the driving element 20 of the clutch 6, which will be turning with the shaft 5 driven by shaft 12 at this time, may not be brought into contact with the yet static driven element 24. Severe shock to the jaws 21 and 23 of clutch elements 20 and 24 is thus prevented.

Now assume that the operator desires to effect operation of whatever device may be operably connected to the chain and sprocket wheel arrangement 8. The operator will first effect disengagement of the friction clutch 3 through venting of the chamber 42 in the clutch motor 15 to atmosphere by way of the pipe 91 as effected by the valve device 60 in response to movement of its lever 82 from "Engage" position to "Disengage" position, as will be appreciated from previous description.

Upon disengagement of the friction clutch 3, the shaft 12, chain and sprocket arrangement 7, shaft 5 and driving element 20 of clutch 6 will come to rest.

While the above is occurring, fluid under pressure will release from the control chamber in the relay valve device 64 by way of the communication 118 in the relay valve device 63, a branch of the pipe 121, the choke 65 and the pipe 91; the choke 65 allowing ample time for the shaft 5 to come to rest before full release of fluid under pressure from the control chamber of the relay valve device 64.

Upon release of fluid under pressure as above from its control chamber, the relay valve device 64 will respond to disestablish its communication 119 which connects the pipe 120 to atmosphere via pipe 125 and to establish its communication 118 which connects the pipe 120 to the pipe 93. Fluid under pressure supplied to the pipe 93 by way of the control device 62 with its lever 82 in "Engage" position will then flow via communication 118 in relay valve device 64, and the pipe 120 into the chamber 42 in clutch motor 30 to cause engagement of the jaw clutch 6 and into the control chamber in the relay valve device 63 to cause same to disestablish its communication 118, which connects the pipe 122 to the now vented pipe 121, and to establish its communication 119 which connects said pipe 122 to atmosphere via the pipe 123. The control chamber in the relay valve device 64 will remain vented to atmosphere at this time so that its communication 118 will remain established and connecting the pipe 120 to the charged pipe 93.

With the jaw clutch 6 engaged, the friction clutch 3 may be engaged to effect a driving connection between the prime mover 1 and the shaft 12, hence the chain and sprocket arrangement 8, as desired, through the medium of the shaft 12, chain and sprocket arrangement 7, the shaft 5, and the engaged jaw clutch 6, without damage to either clutch.

As will be appreciated from previous description, engagement of the friction clutch 3 will be effected through movement of the operator's lever 82 from "Disengage" position to "Engage" position, with resultant charging of the chamber 42 in the clutch motor 15 by fluid under pressure supplied to the pipe 91. Fluid under pressure from the pipe 91 will also flow by way of the check valve 66 to pipe 121, but since the communication 118 in the relay valve device 63 is not established at this time, such fluid under pressure will not flow to the control chamber of the relay valve device 64, so that the status of the latter device will remain as aforedescribed maintaining connection between the pipe 120 and the now charged pipe 93 to hold the jaw clutch 6 engaged.

Thus it will be seen that according to operation of the invention, the jaw clutch 6 may not be engaged while its driving element 20 is being driven through the engaged friction clutch 3, thereby precluding damage to the jaw clutch 6 and equipment which might result were the latter clutch to be engaged while its driving element was rotating.

While the chain and sprocket arrangement 8 is being driven by the prime mover 1 through the medium of the engaged jaw clutch 6 and friction clutch 3, either or both of these clutches may be disengaged. If the friction clutch 3 is disengaged, by venting of the pipe 91 through operation of the control valve device 60, such venting will not influence the position of either of the relay valve devices 63 and 64 which will maintain their communication 119 and 118 established, respectively. The pipe 120 will remain connected to the yet charged pipe 93, so that the jaw clutch 6 will remain engaged.

With the jaw clutch yet engaged the friction clutch 3 may be engaged through pressurization of the pipe 91, again without influencing the set up of the relay valve devices 63 and 64.

If, while both the friction clutch 3 and the jaw clutch 6 are engaged, it is desired to effect disengagement of the jaw clutch 6, such may be effected through movement of the operator's lever 82 of the valve device 62 from its "Engage" position to its "Disengage" position with resultant venting of the pipe 93 to atmosphere. Fluid under pressure will then release from the chamber 42 in the clutch motor 30 and from the control chamber in the relay valve device 63 by way of the pipe 120, the communication 118 in the relay valve device 64 and the now vented pipe 93. Release of fluid under pressure from its control chamber will render the relay valve device 63 responsive to disestablish its communication 119 which connects the pipe 122 to the vent pipe 123 and to establish its communication 118 which connects said pipe 122 to the yet charged pipe 121. Fluid under pressure from the pipe 91 will then flow by way of check valve 66, the pipe 121 and communication 118 in the relay valve device 63, and the pipe 122 to the control chamber in the relay valve device 64 which will respond to disestablish its communication 118 which connects the pipe 120 to the now vented pipe 93 and to establish its communication 119 which connects said pipe 120 to atmosphere by way of the vent pipe 125. With the relay valve devices 63 and 64 now set up as just described, it will be seen that the jaw clutch 6 may not be reengaged while the friction clutch 3 is engaged, since any fluid under pressure supplied to the pipe 93 for effecting such engagement will be prevented from reaching the clutch motor 30 by the relay valve device 64 with its communication 118 disestablished at this time. The jaw clutch 6 thus is protected from jarring engagement since, with the friction clutch 3 engaged and the prime mover 1 in operation, the driving element 20 of said jaw clutch will be rotating with the shaft 5 as driven through the chain and sprocket arrangement 7 and the shaft 12.

With the jaw clutch 6 thus disengaged, disengagement of the friction clutch 3 may be effected by venting of the pipe 91 to atmosphere through movement of the operator's lever 82 of the control valve device 60 to its "Disengage" position, as will be appreciated from previous description. Fluid under pressure from the control chamber in the relay valve device 64 will then release at a timed rate by way of the pipe 122, communication 118 in the relay valve device 63, the pipe 121, the choke 65 and the pipe 91. Substantially upon complete release of fluid under pressure from the control chamber in the relay valve device 64, said relay valve device will respond to disestablish its communication 119 and to establish its communication 118 for again connecting the pipe 120 to the pipe 93 so that again engagement of the jaw clutch 6 may be effected by supplying fluid under pressure to the pipe 93, since such fluid under pressure may then reach the chamber 42 in the clutch motor 30. The choke 65 so times the above-described release of fluid under pressure from the control chamber in the relay valve device 64 by way of the vented pipe 91 as to allow sufficient time for disengagement of the friction clutch 3 before connection is again established between the pipes 120 and 93 by way of which fluid under pressure may then be supplied to clutch motor 30 for engaging the jaw clutch 6.

*Description of alternate structure*

Referring to Fig. 3, in place of the relay valve devices 63 and 64 employed in the structure in Fig. 1 to prevent engagement of the jaw clutch 6 while the friction clutch 3 is engaged a locking cylinder device 200 may be employed. The device 200 may comprise a hollow cylindrical casing 201 which may be fixed by any suitable means (not shown) to the casing of the control valve device 62. A piston 202 is slidably disposed within the casing 201; dividing the interior thereof into a pressure chamber 203 at one side and a spring chamber 204 at its opposite side. The pressure chamber 203 may be connected to the pipe 121 in the structure shown in Fig. 1 with the relay valve devices 63 and 64 omitted. A compression spring 205 is disposed in the spring chamber 204 and arranged to urge the piston 202 to a release position in which it is shown in the drawing seated against an annular shoulder 206 at one end of the casing. The chamber 204 is constantly open to atmosphere by way of such as a port 207. A stop rod 208 is attached to the piston 202 which extends through the chamber 204 and outwardly through an accommodating opening in the casing. The stop rod 208 is so arranged that its projecting end may be moved by piston 202 into the path of travel of the lever 82 of the control valve device 62 to prevent movement of said lever in slot 83 out of its "Disengage" position toward its "Engage" position. To allow for movement of lever 82 out of "Engage" position to "Disengage" position even though the cylinder device 200 may be in its locking position, the rod 208 may be provided with a hinged joint 209, including a tension spring 210 arranged to urge portions of the stop rod 208 toward aligned positions in which they are shown in the drawing. The pipe 93 from the control valve device 62 may be connected directly to the clutch motor 30 in Fig. 1, rather than by way of the relay valve device 64 which would be omitted in this alternate structure.

In operation of the alternate arrangement employing the device shown in detail in Fig. 3 in lieu of the relay valve devices 63 and 64 in Fig. 1, assume that the prime mover 1 is operating and that both the operator's levers 82 of the control valve devices 60 and 62 are in their "Disengage" positions, with the pipes 91 and 93 consequently vented to atmosphere, as therefore also will be the respective chambers 42 in the fluid pressure clutch motors 15 and 30, so that both the friction clutch 3 and the jaw clutch 6 will be disengaged. It will be seen that supply of fluid under pressure from the valve device 60 to the pipe 91 will effect engagement of the jaw clutch 3, and supply of fluid under pressure to the pipe 93, now considered as being connected to the chamber 42 in the clutch motor 30, will effect engagement of the jaw clutch 6.

Assume now that by operation of the valve device 60 engagement of the friction clutch 3 is effected as a consequence of supply of fluid under pressure to the pipe 91, with the driving element 20 of the jaw clutch 6 brought into rotation as a result of such engagement. With its driving element 20 rotating, it is desirable that the jaw clutch 6 not be engaged at this time, and such will be prevented by action of pressure of fluid which will flow from the pipe 91, through the check valve 66 and pipe 121 into the chamber 203 in the locking cylinder device 200 to cause movement of the stop rod 208 into the path of travel of the operator's lever 82 of valve device 62 through actuation of piston 202 in said device 200. Since at this time the lever 82 of valve device 62 is in its "Disengage" position, same is prevented from being moved out of this position by the stop rod 208, so that fluid under pressure may not be supplied to pipe 93 to cause engagement of the jaw clutch 6. With the friction clutch 3 engaged, it will be seen that according to the invention the jaw clutch 6 may not be engaged.

If engagement of the jaw clutch 6 is desired, for example to set up for driving the chain and sprocket arrangement 8, the friction clutch 3 need first be disengaged through venting of the pipe 91 to atmosphere by operation of the valve device 60. Fluid under pressure in chamber 203 in the locking cylinder device 200 will then release at a controlled rate by way of the pipe 121, choke 65 and pipe 91 to allow the spring 205 in said device 200 to effect movement of stop rod 208 to its retracted position in which it is shown in the drawing out of the path of travel of the lever 82 of the valve device 62 to allow for movement of said lever out of its "Disengage" position for effecting engagement of the jaw clutch 6. The choke 65 so controls the rate of release of fluid under pressure from the chamber 203 in the locking cylinder device 200 relative to the rate of release of fluid under pressure from the chamber 42 in the clutch motor 15 as to allow the friction clutch 3 to be disengaged and the jaw clutch driving element 20 to come to rest before engagement of the jaw clutch 6 is made possible. Such engagement of the jaw clutch 6 may then be effected by supply of fluid under pressure to the chamber 42 in clutch motor 30 by way of pipe 93 through movement of the lever 82 of valve device 62 to its "Engage" position.

With the jaw clutch 6 thus engaged, the friction clutch 3 may be engaged by supply of fluid under pressure to the chamber 42 in clutch motor 15 by way of the pipe 91 by operation of the valve device 60. As before, fluid under pressure thus supplied to the pipe 91 will also flow by way of the pipe 91, the check valve 66 and the pipe 121 to the chamber 203 in the locking cylinder device 200, thus causing movement of the projecting portion of stop rod 208 into the path of travel of the lever 82 of valve device 62, which lever is in its "Engage" position at the time.

With both the friction clutch 3 and the jaw clutch 6 engaged, either may be disengaged while the other remains engaged, or both may be disengaged simultaneously or in any order.

The friction clutch 3 may be disengaged by venting pipe 91 to atmosphere with resultant retraction of stop rod 208 by virtue of release of fluid under pressure from the chamber 203 in the locking cylinder device 200 by way of pipe 121 and choke 65, while release of the jaw clutch may subsequently be disengaged through movement of lever 82 of device 62 to its "Disengage" position.

The jaw clutch 6 may be disengaged while the friction clutch 3 remains engaged, by movement of the lever 82 of the valve device 62 from its "Engage" position to its "Disengage" position. During such movement, the lever 82 will engage the portion of the stop rod 208 projecting in its path and will cause rocking movement of same about the hinged joint 209, and substantially upon attainment of its "Disengage" position said lever will leave the projecting portion of lever 208, whereupon the spring 210 will effect return of the projecting portion of the stop rod 208 to its aligned position projecting into the path of travel of said lever now in its "Disengage" position to prevent engagement of the jaw clutch while the friction clutch remains engaged.

Disengagement of the friction clutch 3 may then be effected as previously described.

Summary

It will now be seen that I have provided apparatus for controlling selective engagement of a friction clutch and a jaw clutch arranged in series between a prime mover and an output shaft, which apparatus comprises means operable automatically to prevent engagement of the jaw clutch when the friction clutch is engaged, thereby precluding possibility of damage to said jaw clutch, which otherwise might occur were same to be engaged while being driven through said friction clutch.

Having now described the invention, what I claim as new and desire to secure by Letters Patent, is:

1. Control apparatus for a first fluid pressure actuator and a second fluid pressure actuator, comprising first control valve means for supplying fluid under pressure to said first fluid pressure actuator, second control valve means for supplying fluid under pressure to said second fluid pressure actuator, interlock means operable by fluid under pressure supplied to said second fluid pressure actuator to close fluid pressure supply communication to said first fluid pressure actuator, and interlock controlling means operable by fluid under pressure supplied to said first fluid pressure actuator to close fluid pressure operative supply communication to said interlock means.

2. Control apparatus for a pair of fluid pressure actuators, comprising in combination with a source of fluid under pressure, a first conduit for fluid pressure connection with one of said fluid pressure actuators, a second conduit for fluid pressure connection with the other of said fluid pressure actuators, a third conduit, a first operator's control valve device operable selectively to connect said third conduit either to said source or to atmosphere, a second operator's control valve device operable selectively to connect said second conduit either to said source or to atmosphere, a first relay valve device responsive to supply and release of fluid under pressure to and from a control chamber selectively to connect said first conduit to atmosphere and to said third conduit, respectively, and a second relay valve device responsive to supply and release of fluid under pressure to and from said first conduit selectively to connect said control chamber to atmosphere and to said second conduit, respectively.

3. The combination as set forth in claim 2, including choke-and-check valve means interposed between said second conduit and said second relay valve device to provide for unrestricted and restricted supply and release, respectively, of fluid under pressure to and from said control chamber by way of said second conduit.

4. Control apparatus for a pair of fluid pressure actuators, comprising in combination with a source of fluid under pressure, first conduit means for conveying fluid under pressure to and from one of said fluid pressure actuators, second conduit means for conveying fluid under pressure to and from the other of said fluid pressure actuators, a first control valve device operable by movement of an operator's lever selectively to a supply position or to a release position to connect said first conduit means to said source or to atmosphere, respectively, a second control valve device operable selectively to connect said second conduit means to said source or to atmosphere, interlock means operative in response to supply of fluid under pressure from said second conduit means to prevent movement of said lever from said release position to said supply position and operative in response to release of fluid under pressure via said second conduit means to allow for such movement, and means associated with said interlock means to all times allow for movement of said lever from said supply position to said release position.

5. The combination as set forth in claim 4, including choke-and-check valve means interposed between said interlock means and said second conduit means to provide for unrestricted and restricted supply and release, respectively, of fluid under pressure to and from said interlock means.

6. Control apparatus comprising a first fluid pressure actuator, a second fluid pressure actuator, interlock means responsive to pressurization of said first fluid pressure actuator to prevent subsequent co-existent pressurization of said second fluid pressure actuator, and means responsive to pressurization of said second fluid pressure actuator to render said interlock means non-responsive to pressurization of said first fluid pressure actuator.

7. Control apparatus for a pair of fluid pressure actuators, comprising interlock means responsive to supply of fluid under pressure to one actuator to prevent supply of fluid under pressure to the other actuator and responsive to release of fluid under pressure from said one actuator to allow for supply of fluid under pressure to said other actuator, timing means to afford a lapse in time between release of fluid under pressure from said one actuator and response of said interlock means, and operator's control means operable to effect supply and release of fluid under pressure to and from said one actuator, said other actuator or both of said actuators.

ROY R. STEVENS.

REFERENCES CITED

The following references are of record in the file of this patent:

UNITED STATES PATENTS

| Number | Name | Date |
|---|---|---|
| 1,762,965 | Ehlers | June 10, 1930 |
| 1,775,427 | Gregoire | Sept. 9, 1930 |
| 1,922,777 | Pigott | Aug. 15, 1933 |
| 2,117,852 | Pearmain | May 17, 1938 |
| 2,180,154 | Lenz | Nov. 14, 1939 |
| 2,444,391 | Whitfield | June 29, 1948 |
| 2,464,986 | Miller | Mar. 22, 1949 |
| 2,489,450 | Crookston | Nov. 29, 1949 |